United States Patent Office 3,719,242
Patented Mar. 6, 1973

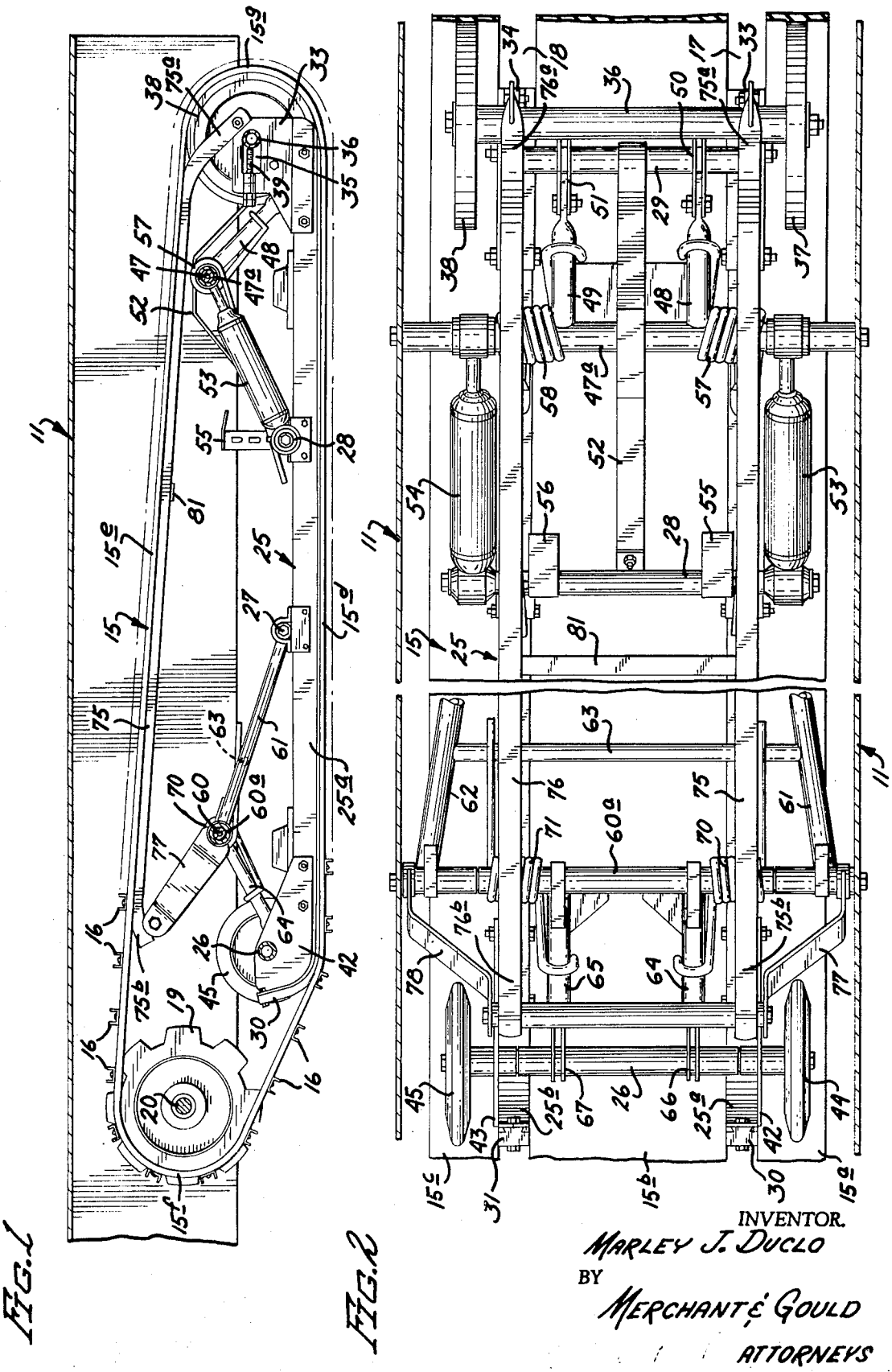

3,719,242
SNOWMOBILE TRACK SUPPORT SYSTEM
Marley J. Duclo, Roseau, Minn., assignor to
Textron Inc., Providence, R.I.
Filed Feb. 4, 1971, Ser. No. 112,690
Int. Cl. B62m 27/02
U.S. Cl. 180—5 R  3 Claims

ABSTRACT OF THE DISCLOSURE

A suspension system for a snowmobile is shown, having a pair of slide rails for engagement with the lower run of the drive track. A yieldable suspension system mounted on the body and positioned between the upper and lower runs of the track supports the snowmobile on the lower run. A pair of spaced guide rails are positioned below the upper return run to provide support for the upper run. The guide rails are mounted so as to remain in contact with the upper run over substantially their entire length during substantially all movements of the suspension system with respect to the body.

BACKGROUND OF THE INVENTION

Field of the invention

This invention relates generally to suspension systems for vehicles and more particularly relates to a snowmobile suspension system in which means are provided to support the upper return run of the drive track.

Description of the prior art

This invention is an improvement to the apparatus disclosed in the Ronald I. Brandli et al. U.S. application Ser. No. 846,153 that was filed July 30, 1969, entitled "Tracked Vehicle Suspension System." The Brandli et al. structure, as well as other prior art suspension systems of which I am aware, have failed to control movements of the upper return run of the drive track. In the modern snowmobile, a pair of drive sprockets engage the front end of the drive track. Power is thus transferred directly from the drive sprocket to the upper return run of the track. This tends to hold the upper return run in a taut condition when power is being applied. However, when the vehicle decelerates (i.e. when the vehicle is moving but no power is being applied to the track) the upper return run may become slack for a short period of time. Also, rapid movements of the suspension frame with respect to the body combined with changes in speed may not permit the suspension system to take up slack in the track quickly enough to maintain the upper run in a taut condition. The upper run thus can alternate between an extremely taut condition and an extremely loose condition.

These changes in the positioning and tautness of the upper run can cause considerable difficulty. The lower surface of the upper run may continually rub against the suspension system thus causing wear to both the suspension system and track. Rapidly snapping the track from a relatively loose condition to a taut condition when power is applied can also place undesirable strains on the track and on the suspension system. Under some circumstances, the upper return run will gyrate wildly. In addition to the other problems heretofore described, this reduces optimum performance because it delays power application to the lower run and absorbs engine power. As mentioned in the above-identified Brandli et al. application, the lower run of the track must be maintained in a relatively flat condition if optimum performance is desired. In like manner, I have discovered that performance is enhanced if the upper return run is also maintained in a relatively flat condition during operation of the vehicle.

SUMMARY OF THE INVENTION

The present invention provides apparatus for engaging and supporting the upper return run of the snowmobile track over substantially its entire length during substantially all movements of the suspension system with respect to the body. In the preferred embodiment shown, a pair of guide rails are connected at their rear ends adjacent the rear idlers and, their front ends are supported by a pair of support arm pivotally connected to a front suspension support shaft. The guide rails are pivotally secured at both ends so that movements of the suspension system are accommodated.. Although the invention is shown in combination with the specific suspension system of the previously identified Brandli et al. application, it could be used as well in combination with other common snowmobile suspension systems.

BRIEF DESCRIPTION OF THE DRAWINGS

FIG. 1 is a fragmentary view in side elevation of the snowmobile suspension system, portions thereof being broken away and portions being shown in section; and FIG. 2 is an enlarged top plan view of the suspension system shown in FIG. 1, portions thereof being broken away and portions being shown in section.

DESCRIPTION OF THE PREFERRED EMBODIMENT

Because the present invention is shown in combination with the invention of the previously identified Brandli et al. application, it was not considered necessary to show as many details of the snowmobile and suspension system. The details of such structures are shown in the previously identified application and are incorporated herein by reference. Referring now to the drawings, the invention is an improvement to a snowmobile having an elongated unitary body including an inverted, generally U-shaped rear or tunnel portion 11. Mounted beneath and partially within the confines of rear portion 11 is an endless drive track 15 formed from three separate endless belts 15a, 15b and 15c that are held together by a plurality of spaced, transversely extending cleats 16 secured by rivets or the like to the outer surface thereof. Preferably, each of the track portions 15a, 15b and 15c is molded from a single piece from rubber provided with suitable reinforcing materials, although the particular form of track used is not critical to the present invention.

The three track portions 15a, 15b nad 15c are spaced and in conjunction with the cleats 16 define two rows 17 and 18 of openings for reception of the teeth of a pair of drive sprockets 19, one of which is shown, mounted on a transverse drive shaft 20 journaled at the front end of rear portion 11. The two sprocket wheels 19 ride in the openings 17 and 18 between the track portions and the teeth thereof engage the cleats 16 to drive the track.

Although not shown, one end of the drive shaft 20 is provided with a sprocket wheel for engagement with a drive chain extending from the snowmobile transmission. The two sprocket wheels 19 provide the driving force for the track 15 and also support the front end thereof. Drive track 15 has a lower ground engaging run 15d, an upper return run 15, a front end portion 15f engaging sprocket wheels 19, and a rear end portion 15g located adjacent the rear end of the body.

An elongated, unitary suspension frame 25 is positioned between drive run 15d and return run 15e. Frame 25 comprises a pair of longitudinally extending, parallel frame members 25a and 25b. Frame members 25a and 26b are held in this spaced relationship by transversely extending shaft means including a forward pair of shaft means 26 and 27 and a rearward pair of shaft means 28 and 29. These shaft means hold the two frame members 25a and 25b a distance apart corresponding to the distance between the rows 17 and 18 in track 15.

Secured to the bottom surface of frame members 25a and 25b are lower slide or skid sections 30 and 31 made from a material having a low coefficient of friction, such as ultra high molecular weight polyethylene. The slide sections 30 and 31 are secured to the members 25a and 25b by a dovetail connection and by a forwardly located bolt, as shown on the drawings. Basically, the two slide rails comprising members 25a–30 and 25b–31 extend into the two rows of openings 17 and 18 in the track 15, and the bottom surfaces thereof engage the top surfaces of the cleats 16.

Bolted to the rear end of frame members 25a and 25b are a pair of upstanding support plates 33 and 34. Each of the plates 33 and 34 is provided with a horizontally extending slot 35 through which extends an idler shaft 36. A pair of idler wheels 37 and 38 are rotatably mounted on the opposite ends of shaft 36. Support plates 33 and 34 each carry a threaded adjustment device 39 to adjust the position of shaft 36 in the openings 35. Drive track 15 is entrained over this rear idler assembly with the two idler wheels 37 and 38 engaging the inner surface of track portions 15a and 15c. The threaded adjustment devices 39 move the idler wheels forwardly or rearwardly with respect to the frame 25 to align and properly tension the drive track. It is noted that this rear idler assembly is supported solely by frame 25 and is not in any way directly connected to the vehicle body.

Bolted to the front ends of frame members 25a and 25b are another pair of upstanding support plates 42 and 43 that provide support for the curved front end portions of slides 30 and 31. Shaft means 26 also extends through plates 42 and 43 for support thereby. A pair of idler wheels 44 and 45 are mounted on the ends of shaft means 26 for engagement with the inner surfaces of track portions 15a and 15c.

Extending laterally across rear portion 11, through openings in the opposite vertical side walls thereof, is a support shaft 47 that is positioned below the return run 15e and above the suspension frame 25. The ends of shaft 47 are threaded and are secured to the rear portion 11 by suitable threaded nuts as shown in FIG. 2. A tubular sleeve 47a is mounted on shaft 47 and extends between the two side walls. A pair of spaced support arms 48 and 49 are welded to sleeve 47a and extend downwardly and rearwardly therefrom. Shaft means 29 also includes a rotatable sleeve to which is secured two spaced pairs 50 and 51 of flat link members that extend forwardly and downwardly therefrom. The lower ends of the two support arms 48 and 49 each extend between a corresponding pair of the link members 50 and 51 and are secured for pivotal movements with respect thereto by means of suitable bolts. This pivotal linkage permits suspension frame 25 to move a predetermined amount longitudinally relative to the snowmobile body but prevents more than an insignificant amount of relative lateral movement between the frame and the body.

A pair of shock absorbers 53 and 54 have their ends connected to sleeve 47a and shaft means 28. Extending upwardly from shaft means 28, directly above frame members 25a and 25b, are a pair of fixed bracket members 55 and 56 each having a plurality of vertically spaced hooks formed thereon.

The central portions of a pair of torsion springs 57 and 58 are mounted on sleeve 47a. Rearwardly extending end portions of the two springs engage the support arms 48 and 49. The forwardly extending end portions extend over and rest on shaft means 28. The two springs 57 and 58 tend to resist any downward movement of the snowmobile body with respect to suspension frame 25. The spring tension can be adjusted by placing the forward ends of the springs over selected ones of the hooks on bracket members 55 and 56. The two shock absorbers 53 and 54 are designed to damp oscillations of the two springs. A strap 52 connected at its ends to shaft means 28 and 29 passes over shaft 47 to limit movement of the frame away from the body.

Another mounting shaft 60 having a sleeve 60a mounted thereon extends across the body between the upper and lower runs of drive track 15, as previously described for shaft 47. Shaft 60 is positioned above the front end of frame 25 and rearwardly of the drive sprocket wheels 19. Welded to the opposite ends of sleeve 60a are a pair of control arms 61 and 62 that extend downwardly and rearwardly therefrom for connection at their lower ends to the tubular sleeve on the next rearwardly located shaft means 27. The upper ends of the control arms 61 and 62 are thus pivotally connected with respect to the vehicle body and the lower ends of the control arms are pivotally connected with respect to the suspension frame 25. A tubular brace member 63 extends between the two control arms.

Also welded to sleeve 60a are a pair of spaced support arms 64 and 65 that extend forwardly and downwardly therefrom for connection at their lower ends to spaced pairs 66 and 67 of link members mounted on the sleeve on shaft means 26. The two pairs of link members 66 and 67 extend downwardly and rearwardly from shaft means 26 and are connected at their free ends to the lower ends of support arms 64 and 65 by suitable bolts permitting pivotal movements therebetween.

Also mounted on sleeve 60a are a pair of torsion springs 70 and 71. The rearwardly extending end portions of the torsion springs rest on the top of tubular brace 63 and the forwardly extending end portions are supported by the upper surfaces of the two front support arms 64 and 65. Again, the two torsion springs 70 and 71 tend to oppose downward movements of the body with respect to the suspension frame 25.

Broadly speaking, the two frame members 25a and 25b, and the two slides 30 and 31 connected thereto, form a pair of slide rails for engagement with the lower ground engaging drive run of the track. The rear end of the vehicle body is supported on these two slide rails by the two yieldable suspension assemblies mounted on shafts 47 and 60. The front end of frame 25 can move upwardly with respect to the body by causing control arms 61 and 62 to pivot against the tension of the two torsion springs 70 and 71. The rear end of the suspension frame 25 is yieldingly supported by the support arms 48 and 49 in cooperation with the torsion springs 57 and 58. For more details on the functioning of this suspension system, reference can be made to the previously identified Brandli et al. application.

A pair of spaced guide rails 75 and 76 are positioned below the upper return run 15e so as to engage the cleats 16 in rows 17 and 18. Guide rails 75 and 76 are long tubular members that have downwardly curving rear end portions 75a and 76a that are pivotally secured to the top edges of support plates 33 and 34 by means of bolts as shown. Front end portion 75b and 76b of the guide rails 75 and 76 are also curved downwardly and are connected by a cross shaft 80, the opposite ends of which are pivotally connected by bolts to a pair of support arms 77 and 78 that are in turn pivotally secured at their bottom ends to the opposite ends of shaft 60. In the preferred embodiment, the two support arms 77 and 78 extend wardly and upwardly from shaft 60 to hold the two guide rails 75 and 76 in position to support the upper return run of the track. Again in the preferred embodiment, the two guide rails 75 and 76 are mounted directly above the two slide rails so that they lie in the two rows of openings 17 and 18 for engagement with the cleats 16. The guide rails 75 and 76 are almost as long as the upper return run so that they support the upper return run over substantially its entire length. The guide rails 75 and 76 are properly spaced by their end connections and by a centrally located support member 81 connected therebetween.

The two guide rails 75 and 76 are pivotally mounted as described so that movements of the suspension frame 25 with respect to the body can be accommodated. If the rear end of the frame 25 moves upwardly in response to a shock, guide rails 75 and 76 move with it to remain in engagement with the upper run of the track. When this type of movement occurs, some pivoting of the front ends of guide rails 75 and 76 will occur about the two support arms 77 and 78. If the front end of the suspension frame 25 moves upwardly with respect to the body, very little movement of the guide rails 75 and 76 will occur because their front ends are not mounted on the suspension frame. This will again tend to keep the guide rails in contact with the upper return run. These guide rails tend to keep the upper return run in a relatively flat condition under all types of operation. This reduces wear and tear on the belt and on the suspension system and improves performance by making the drive track more immediately responsive to increased application of power. Guide rails of this type can be used with any modern suspension system to improve vehicle reliability and performance.

What is claimed is:

1. In a snowmobile having a unitary body, an endless drive track including a lower ground-engaging run and an upper return run, said track comprising three endless spaced portions connected by transversely extending ground-engaging cleats to form two spaced rows of sprocket teeth receiving openings on opposite sides of the middle portion, a pair of drive sprockets mounted on the body and engaging said cleats in said rows at the front end of said drive track to propel the snowmobile, a suspension frame separate from said drive sprockets positioned between said upper and lower runs, said frame including a pair of spaced slide rails for engaging the cleats in said rows in the lower run of said track, idler means mounted on said frame for supporting a rear end of said drive track, and yieldable suspension means mounting said body on said frame, the improvement comprising a pair of spaced guide rails positioned below said upper return run for engaging said cleats in said rows in said upper run, and means for mounting said guide rails on said frame adjacent said idler means at their rear ends and on said body at their forward ends so that said guide rails remain in contact with said upper run over a major portion of its length during substantially all movements of said frame with respect to said body.

2. The apparatus of claim 1 wherein a front end of said frame and suspension means is connected to said body by means of a transversely extending shaft mounted on said body, wherein said guide rails are positioned above said shaft, and wherein a pair of support arms are pivotally secured between the front ends of said guide rails and said shaft to hold said guide rails in engagement with said upper run.

3. In a snowmobile having a body and an endless drive track including a lower ground-engaging run and an upper return run, drive sprocket means on said body engaging said drive track to prope the snowmobile, a yieldable suspension system mounted on said body and positioned between said upper and lower runs to support said snowmobile on said lower run, a front end of said suspension system being secured to said body by transversely extending shaft means, said suspension system including rear idler means, the improvement comprising guide rail means positioned below said upper return run and above said shaft means for engaging said upper run, and means for mounting said guide rail means so that said guide rail means remain in contact with said upper run over a major portion of its length during substantially all movements of said suspension system with respect to said body, said means including a rear end of said guide rail means being pivotally secured to said suspension system adjacent said rear idler means and support arm means pivotally secured between said shaft means and a front end of said guide rail means.

References Cited

UNITED STATES PATENTS

| | | | |
|---|---|---|---|
| 3,485,312 | 12/1969 | Swenson | 305—24 X |
| 2,339,886 | 1/1944 | Shannon | 180—5 R |
| 1,660,104 | 2/1928 | Smyth | 305—18 |
| 1,488,629 | 4/1924 | Wick | 305—25 |
| 1,387,033 | 8/1921 | Ball | 305—25 X |

RICHARD J. JOHNSON, Primary Examiner

U.S. Cl. X.R.

305—25